United States Patent Office 2,840,546
Patented June 24, 1958

2,840,546

UNSATURATED QUATERNARY AMMONIUM COMPOUNDS AND POLYMERS

Robert S. Yost, Oreland, Pa., assignor to Rohm & Haas Company, Philadelphia, Pa., a corporation of Delaware No Drawing. Application January 6, 1956
Serial No. 557,654

2 Claims. (Cl. 260—77.5)

This invention is concerned with novel, useful quaternary ammonium compounds. This application is a continuation-in-part of each of my copending applications Serial No. 500,300, filed April 8, 1955; and Serial Nos. 533,510 and 533,511, both filed on September 9, 1955.

The quaternary ammonium compounds of the present invention have the structure of Formula I:

I
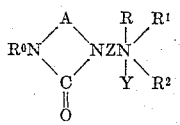

where $R^0$ is selected from the group consisting of hydrogen and vinyl, A is an alkylene group having 2 to 3 carbon atoms of which at least two extend in a chain between the adjoined N atoms, Z is an alkylene group having 2 to 18 carbon atoms of which at least two extend in a chain between the N atoms, R, when not directly attached to $R^1$, is selected from the group consisting of phenyl, benzyl, cyclohexyl, and alkyl and alkenyl groups having from 1 to 18 carbon atoms, $R^1$, when not directly attached to R, is selected from the group consisting of phenyl, benzyl, cyclohexyl, and alkyl and alkenyl groups having from 1 to 18 carbon atoms, R and $R^1$, when attached directly together, form a heterocyclic ring with the adjoining N atom of the formula and are selected from the group consisting of the morpholino residue $=(CH_2CH_2)_2O$, the piperidino residue $$-(CH_2)_5-$$

and the pyrrolidino residue $-(CH_2)_4-$, Y is a negative, salt-forming atom or radical, that is an anion, such as chloride, bromide, iodide, hydroxide, sulfate, methosulfate ($-OSO_3CH_3$), or sulfonates, e. g. phenylsulfonate, p-methylphenylsulfonate and so on, and $R^2$ is selected from the group consisting of phenyl, benzyl, cyclohexyl; alkylphenyl, alkenylphenyl, alkylbenzyl, alkenylbenzyl in which the alkyl and alkenyl groups may have from 1 to 18 carbon atoms; any of the groups just mentioned substituted by halogens, such as chlorine or bromine; phenoxyalkyl, alkoxyalkyl; hydroxyalkyl; hydroxy-substituted aralkyl; $-CH_2R^3$ where $R^3$ is selected from the group consisting of furyl, thienyl, and naphthyl; and alkyl and alkenyl groups having from 1 to 18 carbon atoms.

These quaternary ammonium compounds are readily made directly from a compound of Formula II:

II
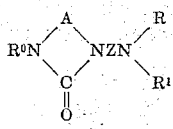

by reacting it with an alkylating agent $R^2Y$ such as methyl chloride, ethyl chloride, benzyl chloride, allyl chloride, substituted allyl chloride, e. g., dodecylallyl chloride, dodecenyl chlorides, alkylbenzyl chlorides, e. g., octylbenzyl chlorides (from diisobutylene), any chloromethylated aromatic-like compound, e. g., chlorobenzyl chloride, chloromethylated thiophene, chloromethylated furane, chloromethylated naphthalene, or corresponding bromides or iodides, e. g., phenoxyethyl bromide, methyl iodide; dimethyl sulfate, dimethyl sulfite, dimethyl phosphite, ethylene oxide, propylene oxide, styrene oxide, and butylene oxide. The quaternization may be effected in a solvent, such as a lower alcohol, e. g. methanol, ethanol, isopropanol. Generally, the reaction may be effected at a temperature between 50° and 120° C., preferably between 70° and 90° C., and conveniently at the temperature of reflux or boiling of the solvent used. The product may be recovered by distilling off the solvent, at atmospheric pressure or in vacuo. The quaternaries can also be made by progressively alkylating a compound of Formula II in which R and/or $R^1$ is or are replaced with hydrogen.

Examples of compounds of Formula II that may be quaternized by reaction with a compound $R^2Y$ in the above manner include: 1-(β-dimethylaminoethyl)imidazolidinone-2; 1 - (β-diethylaminoethyl)imidazolidinone-2; 1-(β-diisopropylaminoethyl)imidazolidinone-2; 1-(β-dibutylaminoethyl)imidazolidinone-2; 1 - (β-dioctadecylaminoethyl)imidazolidinone-2; 1 - (β-morpholinoethyl)-imidazolidinone-2; 1-(β-piperidinoethyl)imidazolidinone-2; 1-(β-pyrrolidinoethyl)imidazolidinone-2; 1-(γ-dimethylaminopropyl)imidazolidinone-2; 1 - (β - diethylaminopropyl)imidazolidinone-2; 1 - (β-dimethylaminoethyl)-5-methyl-imidazolidinone-2; 1-(γ-dimethylaminopropyl)-5-methyl-imidazolidinone-2; 1-(4-dimethylaminobutyl)imidazolidinone-2; 1 - (10 - dimethylaminodecyl)imidazolidinone-2; 1-(β-diethylamino)decyl-5-methyl-imidazolidinone-2; 1 - (β-dimethylaminoethyl)-tetrahydro-pyrimidinone-2; 1 - (β - diethylaminoethyl) - tetrahydro-pyrimidinone-2; 1 - (β-dicyclohexylaminoethyl)-tetrahydro-pyrimidinone-2; 1-(β-(diisopropylamino)propyl) - tetrahydro-pyrimidinone-2; 1 - (5 - dibutylaminopentyl)-tetrahydro-pyrimidinone-2; 1 - (5 - dihexadecylaminopentyl)tetrahydro-pyrimidinone-2; 1 - (β-morpholinoethyl)-tetrahydro-pyrimidinone-2; and 1-(β-(methylbenzylamino)propyl)-tetrahydro-pyrimidinone-2; 1-(β-dimethylaminoethyl)-3-vinyl-imidazolidinone-2; 1-(β-diethylaminoethyl)-3-vinyl-imidazolidinone-2; 1-(β-diisopropylaminoethyl)-3 - vinyl-imidazolidinone-2; 1 - (β-dioctadecylaminoethyl)-3-vinyl-imidazolidinone-2; 1 - (β-morpholinoethyl)-3-vinyl-imidazolidinone-2; 1-(β-piperidinoethyl) - 3 - vinyl-imidazolidinone-2; 1-(β-pyrrolidinoethyl)-3-vinyl-imidazolidinone-2; 1 - (γ-dimethylaminopropyl)-3-vinyl-imidazolidinone-2; 1 - (β - dimethylaminoethyl)-5-methyl-vinyl-imidazolidinone-2; 1 - (4 - dimethylaminobutyl)-5-methyl-3-vinyl-imidazolidinone-2; 1-(β-diethylaminodecyl) - 5-methyl-3-vinyl-imidazolidinone-2; 1 - (10-dimethylaminodecyl)-3-vinyl-imidazolidinone-2; 1 - (β - dimethylaminoethyl)-3-vinyl - tetrahydro - pyrimidinone - 2; 1 - (β-diethylaminoethyl)-3-vinyl-tetrahydro-pyrimidinone-2; 1 - (β-dicyclohexylaminoethyl)-3-vinyl-tetrahydro-pyrimidinone - 2; 1-(β - (diisopropylamino)propyl) - 3 - vinyl-tetrahydro-pyrimidinone-2; 1-(5-dibutylaminopentyl)-3-vinyl-tetrahydro-pyrimidinone-2; 1-(5-dihexadecylaminopentyl)-3-vinyl-tetrahydro-pyrimidinone-2; 1-(β-morpholinoethyl)-3-vinyl-tetrahydro-pyrimidinone-2; 1 - (β - (methylbenzylamino)propyl) - 3 - vinyl - tetrahydro - pyrimidinone - 2. These compounds of Formula II and their preparation are disclosed in my aforesaid applications Serial Nos. 533,510 and 533,511, the disclosure of which is hereby incorporated by reference.

To illustrate more particularly the preparation of the new quaternary compounds, a compound of Formula III
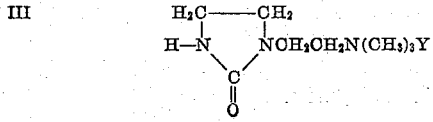

may be obtained in either of two ways. The first method involves the exhaustive methylation of N-(β-aminoethyl)-N,N'-ethyleneurea. This may be accompanied by means of a methyl halide, bromide or iodide or by other methylating agents, such as dimethyl sulfate, the methyl ester of p-toluenesulfonic acid and the methyl ester of benzenesulfonic acid. Illustratively, one mole of the aminoethyl ethyleneurea may be reacted with three moles of the methylating agent, such as methyl chloride, in the presence of an alkaline material, such as sodium carbonate in an alcoholic solution such as in ethanol, isopropanol, amyl alcohol, n-butanol and tert-butanol. The quaternary ammonium compound is soluble in ethanol even in the cold and consequently, to facilitate separation of the product, it is preferable to use a higher alcohol such as butanol in which the product is soluble at elevated temperatures but insoluble in the cold so that, on cooling, the product may be readily precipitated and removed by filtration. The N-(β-aminoethyl)-N,N'-ethyleneurea and the alkylating agent are reacted by heating to a temperature between 60° C. and 200° C. for a time which is generally longer at the lower temperature and shorter at the higher temperature. For example, reaction is preferably carried out at reflux, and when butanol is used a period of about eight to ten hours at the reflux temperature of about 120° C. is generally adequate. At 200° C., a period of three hours may be adequate, and a period of 24 hours is generally satisfactory at about 60° C. The preferred range of temperature is from 90° to 130° C. for a period of time from seven to twelve hours. If desired, reaction may be carried out in the alcoholic solvents under superatmospheric pressure to facilitate the attainment of higher temperatures with any particular alcohol and thereby reduce the time needed.

Generally the methyl chloride or other alkylating agent may be added continuously throughout the reaction period. For example, in a batch containing about one gram mole weight of the N-(β-aminoethyl-N,N'-ethyleneurea, the methyl chloride may be added at a rate of about 250 cc. per minute throughout a ten-hour period. Completion of the reaction is readily detected by determining when carbon dioxide is no longer evolved. On completion of the reaction, the sodium chloride which is undissolved is filtered off, and the filtrate is chilled to precipitate the product when such an alcohol as butanol is used. Filtration is repeated and after an optional washing with butanol, the product may be dried either at normal room temperatures or at elevated temperatures up to 125° C.

An alternative method to produce a compound of Formula III is to react trimethylamine with N-(β-chloroethyl)-N,N'-ethyleneurea. The reaction of this urea derivative with the trimethylamine may be effected in a solvent for the urea, such as benzene, toluene, xylene, or even in water or alcohols such as the alcohols mentioned above. The temperature of reaction may be from room temperature for a period of 24 hours or more up to 200° C. for a period of 15 minutes or so. Preferably the reaction is effected at a temperature of 80° C. to 120° C. for one to eight hours or more, particularly at 100° C. for three to six hours. The quaternary product is insoluble in the hydrocarbon solvents mentioned so that it may be removed merely by filtration. The filtered product may optionally be washed with benzene or other hydrocarbon solvent and may then be dried at room temperature or at somewhat elevated temperature up to 120° C.

If desired, reaction may be effected under pressure such as at about 25 pounds per square inch gauge to obtain higher temperatures for a given solvent. The pressure mentioned for example is adequate to raise the temperature to about 100° C. when the reaction is effected in benzene, or in the alcohols.

The N-(β-chloroethyl)-N,N'-ethyleneurea may be prepared by reacting thionyl chloride ($SOCl_2$) with N-(β-hydroxyethyl)-N,N'-ethyleneurea. The two reactants may be used in approximately equimolar amounts and reaction is preferably effected with the urea dissolved in chloroform. Preferably the thionyl chloride is added gradually. For example, when the reaction involves a batch containing about two moles of the urea, the thionyl chloride may be added over a period of two hours. The reaction is preferably effected at a temperature of 30° C. to 100° C. Advantageously, it may be carried out with the chloroform at reflux at a temperature of about 58° to 66° C. After completion of the addition of the thionyl chloride, the chloroform may be gradually distilled while introducing toluene until the temperature in the vessel reaches about 105° to 109° C. It is then refluxed for about 20 hours in the toluene. The product is soluble in the hot toluene which is cooled to about 5° to 10° C. or lower to precipitate the N-(β-chloroethyl)-N,N'-ethyleneurea. The precipitated product may then be filtered and, if desired, washed with cold toluene. It is then air-dried or dried under a vacuum at room temperature. It has a melting point of 82° to 83° C.

The quarternary ammonium compounds of the present invention having the structure of Formula I serve as: agents for treating and conditioning textiles, including surface-active agents for wetting and cleaning such textiles; lubricating and softening agents to be applied to various materials, especially of cellulosic type, such as fibers and yarns of cellulose esters, especially cellulose acetate, or of rayon, as well as to films of regenerated cellulose; antistatic agents for application to articles made of hydrophobic materials, such as fibers, films, yarns, textile fabrics, and other shaped articles formed of vinyl resins, such as polyvinyl chloride, polyvinylidene chloride, polyacrylonitrile, copolymers of vinyl chloride, vinylidene chloride, and acrylonitrile with each other or with other comonomers including vinyl pyridines, vinyl acetate, methyl acrylate, other acrylates or methacrylates, also nylon and polyesters, such as polyethylene terephthalate.

Besides being useful as chemical intermediates in the preparation of other compounds, the quaternary ammonium compounds of Formula I are useful as fungicides, bactericides and insecticides. They also serve as softeners for cellulosic materials such as regenerated cellulose (cellophane), rayon, cellulose acetate, and also as antistatic agents for cellulose esters such as cellulose acetate, cellulose acetobutyrate; also for nylon, Dacron (polyethylene terephthalate); for polymers of acrylonitrile containing 80% to 90% of acrylonitrile with other comonomers such as vinyl chloride, vinyl pyridine, or mixtures thereof, such as Orlon and Acrilan; for polyvinyl chloride, and copolymers of 75% to 95% vinyl chloride with vinyl acetate or vinylidene chloride with acrylonitrile.

Those compounds of Formula I in which $R^0$ is the vinyl group may be polymerized or copolymerized, or polymers and copolymers of a compound of Formula II in which $R^0$ is the vinyl group may be quaternized by means of an alkylating agent $R^2Y$ under essentially the same conditions as those described above in regard to the quaternization of the monomeric compounds of Formula II.

The polymerization of the compounds of Formula I or II in which $R^0$ is a vinyl group may be effected by an addition mechanism in bulk, solution, emulsion, or suspension technique using any suitable free radical catalyst, but preferably in azo type. In the solution procedure, such solvents as water, dioxane, or a lower alcohol, including ethanol and isopropanol, may be used. A water-insoluble vinyl compound of Formula I or II is readily adapted to the emulsion technique of polymerization. Even the water-soluble monomers are useful in a suspension technique if brine is used.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate, in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

Examples of vinylidene or monoethylenically unsaturated compounds that may be copolymerized with a compound of Formula I or II include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazol, and allyl esters of monocarboxylic acids. Specific ethylenically unsaturated compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, $\alpha$-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis-(vinyloxyethyl)urea, or vinyloxyethyl acrylate or methacrylate, insoluble interpolymers result.

The polymers and copolymers are useful as fungicides, bactericides, and insecticides. They also serve as softeners for cellulosic materials such as regenerated cellulose (cellophane), rayon, cellulose acetate, and also as antistatic agents for cellulose esters such as cellulose acetate, cellulose acetobutyrate; also for nylon, Dacron (polyethylene terephthalate); for polymers of acrylonitrile containing 80% to 90% of acrylonitrile with other comonomers such as vinyl chloride, vinyl pyridine, or mixtures thereof, such as Orlon and Acrilan; for polyvinyl chloride, and copolymers of 75% to 95% vinyl chloride with vinyl acetate or vinylidene chloride with acrylonitrile.

In the following examples, which are illustrative of the invention, the parts and percentages are by weight unless otherwise noted:

*Example 1*

In a reaction vessel fitted with stirrer, reflux condenser, thermometer and gas inlet tube were placed 66.5 parts of N-($\beta$-aminoethyl)-N,N'-ethyleneurea (97% pure), 400 parts of n-butyl alcohol and 53.0 parts of anhydrous sodium carbonate. The mixture was heated to reflux and gaseous methyl chloride was passed in at the rate of about 0.5 to 0.6 part by weight per minute. Refluxing and the introduction of methyl chloride was continued until the evolved gas contained no carbon dioxide (as indicated by the lime-water test) (ten and one-half hours). The hot reaction mixture was filtered to remove sodium chloride and the filtrate was chilled in an ice bath to precipitate the product. Subsequent filtration yielded 86.5 parts (an 83.5% yield) of $\beta$-(N,N'-ethyleneureido)-ethyltrimethylammonium chloride as colorless crystals, M. P. 228° to 229° C. Recrystallization from isopropyl alcohol gave a product melting at 230° C.

*Analysis.*—Calculated for $C_8H_{18}ON_2Cl$: Cl, 17.1%. Found: Cl, 17.1%.

*Example 2*

In a stainless steel, stirrer-equipped autoclave were placed 74.0 parts of N-($\beta$-chloroethyl)-N,N'-ethyleneurea, 59 parts of liquified anhydrous trimethylamine and 264 parts of anhydrous benzene. The autoclave was sealed and the mixture was stirred and heated at 100° to 105° C. for six hours. The product which was insoluble in benzene was separated by filtration and recrystallized from isopropyl alcohol. Yield: 90.2 parts (an 87% yield) of $\beta$-(N,N'-ethyleneureido)ethyltrimethylammonium chloride which melted at 230° C.

*Example 3*

50 parts of 1-($\beta$-dimethylaminoethyl)-imidazolidinone-2 (the product of Example 1(a) of Serial No. 533,510) is dissolved in 100 parts of isopropanol and after heating to reflux 64 parts of methyl chloride is passed in over a six hour period. The isopropanol is chilled to precipitate the product $\beta$-(N,N'-ethyleneureido)ethyltrimethylammonium chloride.

*Example 4*

50 parts of 1-($\beta$-dimethylaminoethyl)-imidazolidinone-2

(the product of Example 1(a) of Serial No. 533,510) is dissolved in 100 parts of isopropanol and 39.8 parts of benzyl chloride is added. The mixture is heated to reflux for 6 hours after which isopropanol and any unreacted benzyl chloride are distilled off, leaving the product β-(N,N'-ethyleneureido)ethylbenzyldimethylammonium chloride.

*Example 5*

The procedure of Example 3 is repeated substituting 48.4 parts of ethylene oxide for the methyl chloride, thereby producing the product β-(N,N'-ethyleneureido)-ethyl(β-hydroxyethyldimethyl)ammonium hydroxide.

*Example 6*

50 parts of 1-(γ-dimethylaminopropyl)-tetrahydro-pyrimidinone-2 is dissolved in 100 parts of methanol and 54.3 parts of phenoxyethylbromide is added. The mixture is heated at reflux for 4 hours, after which the methanol is distilled off, leaving the product γ - (N,N' - trimethyleneureido)propyldimethyl(phenoxyethyl)ammonium bromide.

*Example 7*

The procedure of Example 3 is repeated substituting 200 parts of 1-(β-dioctadecylaminoethyl)-imidazolidinone-2 for the imidazolidinone of that example.

*Example 8*

The procedure of Example 3 is repeated substituting for the imidazolidinone 117 parts of 1-(β-dibutylaminodecyl)-5-methyl-imidazolidinone-2. When deposited on leather and cellulosic textiles, a soft, lubricous, and antistatic finish is obtained.

*Example 9*

(a) A mixture of 18.9 parts 1-(β-dimethylaminoethyl)-3-vinyl-imidazolidinone-2, 18.7 parts of ethanol and 0.37 part of α,α'-azobisisobutyronitrile are heated together, in a nitrogen atmosphere, at 70° C. for six and one-half hours. The resulting clear, viscous solution is diluted with an equal volume of ethanol and the polymer is precipitated by slow addition of its solution to rapidly-stirred hexane. The polymer, a sticky mass, is separated from the hexane solution by decantation of the latter and is redissolved in ethanol to give 110 parts of a 10.3% solids solution.

(b) 12.5 parts of dodecenyl chloride is mixed into the ethanol solution obtained in part (a) hereof and the mixture is heated at reflux for 4 hours. The quaternized-polymer solution is applied to rayon at about 0.1% on the weight thereof, producing a soft feel thereon.

(c) A homopolymer of 1-(β-dioctadecylaminoethyl)-3-vinyl-imidazolidinone-2 is obtained by polymerizing by the procedure of part (a) hereof. Quaternization of the polymer with benzyl chloride in ethanol at reflux produces a polymer having a strong antistatic effect when applied in solution concentrations of 0.3 to 1.5% to fibrous materials, including fibers, filaments, and yarns of cellulose acetate, copolymers of vinyl chloride with vinyl acetate and polymers of acrylonitrile.

*Example 10*

(a) A mixture of 68.5 parts of methyl methacrylate, 31.5 parts of 1-(β-dimethylaminoethyl)-3-vinyl-imidazolidinone-2, 68 parts of toluene and 1.0 part of α,α'-azobisisobutyronitrile is heated in a nitrogen atmosphere at 70° C. for four hours and forty minutes to yield a clear, colorless, viscous solution. The solution is diluted with two volumes of toluene and the polymer is precipitated by the slow addition of its solution to rapidly-stirred hexane. The course, white solid polymer, after drying in vacuo, weighs 83 parts. Analysis of the product shows it to contain 13.7 mole percent of 1-(β-dimethylaminoethyl)-3-vinyl-imidazolidinone units and 86.3 mole percent of methyl methacrylate units.

(b) The polymer of part (a) is dissolved in toluene and an equivalent amount of chloromethylated naphthalene is added. The mixture is treated at reflux for 4 hours and then the toluene is distilled off leaving the quaternized polymer as a white solid mass.

(c) By the general procedure of Example 10, copolymers are obtained from mixtures of:

(1) 25 parts of 1-(β-methylaminoethyl)-3-vinyl-imidazolidinone-2 and 75 parts of isobutylene;

(2) 10 parts of 1-(β-didodecylaminoethyl)-3-vinyl-tetrahydro-pyrimidinone-2, 67 parts of methyl methacrylate, and 23 parts of butyl acrylate;

(3) 5 parts of 1-(β-morpholinoethyl)-3-vinyl-imidazolidinone-2, 90 parts of acrylonitrile, and 5 parts of vinyl acetate;

(4) 80 parts of 1-(β-dicyclohexylaminoethyl)-3-vinyl-tetrahydro-pyrimidinone-2, and 20 parts of styrene;

(5) 50 parts of 1-(β-dimethylaminoethyl)-3-vinyl-imidazolidinone-2, and 50 parts of ethyl acrylate.

Quaternary ammonium salts of the polymers obtained by alkylating with methyl chloride and with benzyl chloride have various uses. All are non-phytotoxic fungicides, those of 3 and 4 being the most effective and tenacious.

It is to be understood that changes and variations may be made without departing from the spirit and scope of the invention as defined in the appended claims.

I claim:

1. A compound of the formula

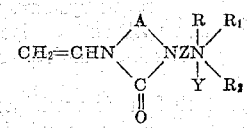

where A is an alkylene group having 2 to 3 carbon atoms of which at least two extend in a chain between the adjoined N atoms, Z is an alkylene group having 2 to 18 carbon atoms of which at least two extend in a chain between the N atoms, R and $R^1$ are individually selected from the group consisting of phenyl, benzyl, cyclohexyl, and alkyl and alkenyl groups having from 1 to 18 carbon atoms and radicals which together and with the adjoining N atom of the formula form a heterocyclic ring selected from the group consisting of morpholino, piperidino, and pyrrolidino, Y is an anion, and $R^2$ is selected from the group consisting of phenyl, benzyl, cyclohexyl; alkylphenyl, alkenylphenyl, alkylbenzyl, and alkenylbenzyl groups in which the alkyl and alkenyl groups have from 1 to 18 carbon atoms; chlorine-substituted and bromine-substituted phenyl, benzyl, and cyclohexyl groups; chlorine-substituted and bromine-substituted alkylphenyl, alkenylphenyl, alkylbenzyl, and alkenylbenzyl groups in which the alkyl and alkenyl groups have from 1 to 18 carbon atoms; phenoxyalkyl, alkoxyalkyl; hydroxyalkyl; hydroxy-substituted aralkyl; —$CH_2R^3$ where $R^3$ is selected from the group consisting of furyl, thienyl, and naphthyl; and alkyl and alkenyl groups having from 1 to 18 carbon atoms.

2. A polymer of a compound defined in claim 1.

References Cited in the file of this patent

UNITED STATES PATENTS

| 2,613,212 | Hurwitz et al. | Oct. 7, 1952 |
| 2,663,702 | Kropa | Dec. 22, 1953 |
| 2,727,016 | Hankins et al. | Dec. 13, 1955 |

OTHER REFERENCES

Reppe: "Acetylene Chemistry," P. B. Reports 18852–S translated from the German), pages 62–63 (1949), Bibliography of Technical Reports (OTS), November 1948.

Fieser & Fieser: "Organic Chemistry," pages 234–235, 2nd edition (1950), D. C. Heath and Co., publishers, Boston, Mass.